(12) United States Patent
Yamaguchi et al.

(10) Patent No.: US 6,370,898 B2
(45) Date of Patent: Apr. 16, 2002

(54) AUTOMOTIVE CLIMATE CONTROL SYSTEM

(75) Inventors: Motohiro Yamaguchi, Aichi-Pref.; Satoshi Itoh, Kariya; Yoshitaka Tomatsu, Chiryu; Yasutaka Kuroda, Anjo; Yasushi Yamanaka, Aichi-Pref., all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/808,933

(22) Filed: Mar. 15, 2001

(30) Foreign Application Priority Data

Mar. 16, 2000 (JP) ........................................ 2000-079356

(51) Int. Cl.⁷ ................................................ B60H 1/32
(52) U.S. Cl. ............................. 62/244; 165/43; 454/160
(58) Field of Search ............................... 62/244; 165/42, 165/43; 454/127, 160

(56) References Cited

U.S. PATENT DOCUMENTS 5,649,429 A    7/1997   Schreiber ..................... 62/186
5,918,475 A    7/1999   Sakakibara et al. ........... 62/186

FOREIGN PATENT DOCUMENTS

| JP | U 3-98108 | 10/1991 |
| JP | U 3-109904 | 11/1991 |
| JP | A 9-11734 | 1/1997 |
| JP | A 9-104222 | 4/1997 |

*Primary Examiner*—William E. Tapolcai
(74) *Attorney, Agent, or Firm*—Harness, Dickey & Pierce, PLC

(57) ABSTRACT

An automotive climate control system is disclosed. As long as an ignition switch is off, a bypass (14) is closed (in this state, a ratio between warm air and cool air is a maximum when the automotive climate control system is activated.), the blowout is set to defrost mode and the introduced air is set to external air mode regardless of the preceding modes of blowout and introduced air (when the ignition switch is on). As a result, the refrigerant leaking from an evaporator (12) flows to an external air inlet (23) smaller in air resistance. Even in the case where the ignition switch is off, therefore, the leaking refrigerant is prevented from flowing into the cabin.

8 Claims, 2 Drawing Sheets

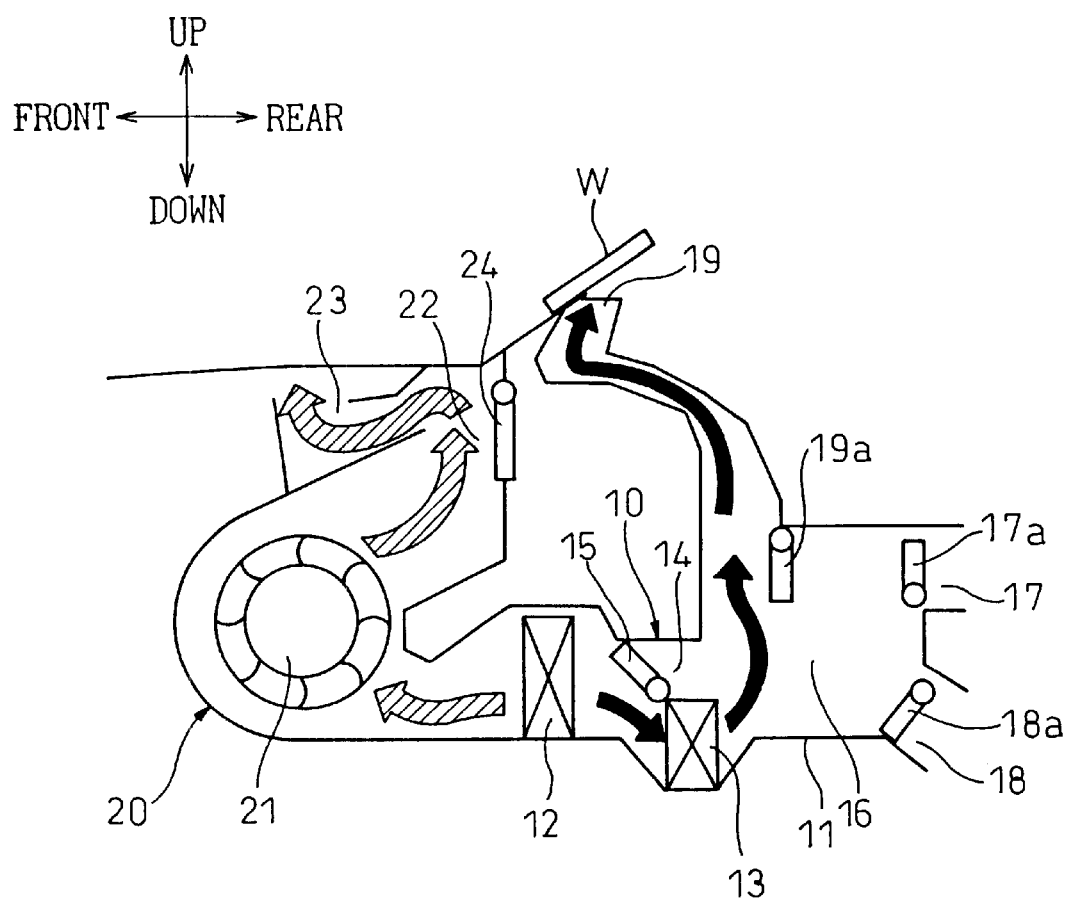

AUTOMOTIVE CLIMATE CONTROL SYSTEM

BACKGROUND OF THE INVENTION

1. Field of the Invention

The present invention relates to an automotive climate control system or, in particular, to an automotive climate control system using carbon dioxide or a hydrocarbon compound (combustible refrigerant) such as propane as a refrigerant.

2. Description of the Related Art

In the invention of an automotive climate control system using a combustible refrigerant such as propane disclosed in Japanese Unexamined Patent Publication (Kokai) No. 9-11734, whether the refrigerant is leaking or not is detected by a sensor and, in the case where a refrigerant leakage is detected, an electric actuator such as a servo motor is activated to open an external air inlet to introduce air from outside the cabin thereby to prevent the leaking refrigerant from flowing into the cabin.

With the aforementioned invention, however, as long as the vehicle is stationary with the ignition switch off, power cannot be supplied to the sensor and the electric actuator. In the case where the refrigerant leaks out while the vehicle is stationary, therefore, action against it cannot be taken.

This inconvenience may be obviated by providing means for supplying power constantly to the sensor and the electric actuator at the sacrifice of an increased power load on the battery.

SUMMARY OF THE INVENTION

In view of the aforementioned fact, the object of the present invention is to provide an automotive climate control system, in which the refrigerant which may leak out is prevented from flowing into the cabin even in the case where the electric equipment on board the vehicle is not supplied with power such as when the ignition switch is in off state.

In order to achieve the above-mentioned object, according to a first aspect of the invention, there is provided an automotive climate control system comprising an air-conditioning casing (11) which allows air to flow therethrough and to be blown out into the cabin, a first heat exchanger (12) arranged in the air-conditioning casing (11) for exchanging heat between the refrigerant and the air, a face opening (17) arranged downstream of the first heat exchanger (12) in the air flow for blowing out the air to the faces of the occupants in the cabin, a foot opening (18) arranged downstream of the first heat exchanger (12) in the air flow for blowing out the air to the feet of the occupants in the cabin, a defroster opening (19) arranged downstream of the first heat exchanger (12) for blowing out the air to the vehicle windshield glass, an internal air inlet (22) arranged upstream of the first heat exchanger (12) in the air flow for introducing the air from the cabin, and an external air inlet (23) arranged upstream of the first heat exchanger (12) for introducing the air from outside the cabin wherein, as long as the electrical equipment mounted on the vehicle is not supplied with power, among a first air path (A) leading from the first heat exchanger (12) to the face opening (17), a second air path (B) leading from the first heat exchanger (12) to the foot opening (18) and a third air path (C) leading from the first heat exchanger (12) to the defroster opening (19), only the air path (C) having a larger air resistance than an air path (E) leading from the first heat exchanger (12) to the external air inlet (23) passes the air therethrough while, at the same time, the air passes through the air path (E) leading from the first heat exchanger (12) to the external air inlet (23).

As a result, the refrigerant which may leak out from the first heat exchanger (12) can be passed to the external air inlet (23). Thus, the refrigerant that may leak from the first heat exchanger (12) while the ignition switch is in off state can be prevented by simple means from flowing into the cabin without any leakage protection device such as a sensor.

According to a second aspect of the invention, there is provided an automotive climate control system comprising an air-conditioning casing (11) which allows air to flow therethrough and to be blown into the cabin, a first heat exchanger (12) arranged in the air-conditioning casing (11) for exchanging heat between the refrigerant and the air, a face opening (17) arranged downstream of the first heat exchanger (12) in the air flow for blowing out the air to the faces of the occupants in the cabin, a foot opening (18) arranged downstream of the first heat exchanger (12) in the air flow for blowing out the air to the feet of the occupants in the cabin, a defroster opening (19) arranged downstream of the first heat exchanger (12) for blowing out the air to the vehicle windshield glass, an internal air inlet (22) arranged upstream of the first heat exchanger (12) in the air flow for introducing the air from the cabin, and an external air inlet (23) arranged upstream of the first heat exchanger (12) for introducing the air from outside the cabin wherein, as long as the electrical equipment on board the vehicle is not supplied with power, among a first air path (A) leading from the first heat exchanger (12) to the face opening (17), a second air path (B) leading from the first heat exchanger (12) to the foot opening (18), a third air path (C) leading from the first heat exchanger (12) to the defroster opening (19), only the air path (C) having the largest air resistance passes the air while, at the same time, the air passes through the air path (E) leading from the first heat exchanger (12) to the external air inlet (23).

As a result, as in the first aspect of the invention, the refrigerant that has leaked out can be prevented from flowing into the cabin with simple means without any protective device such as a sensor.

According to a third aspect of the invention, there is provided an automotive climate control system comprising an air-conditioning casing (11) which allows the air to flow therethrough and to be blown into the cabin, a first heat exchanger (12) arranged in the air-conditioning casing (11) for exchanging heat between the refrigerant and the air, a face opening (17) arranged downstream of the first heat exchanger (12) in the air flow for blowing our the air to the faces of the occupants in the cabin, a foot opening (18) arranged downstream of the first heat exchanger (12) in the air flow for blowing out the air to the feet of the occupants in the cabin, a defroster opening (19) arranged downstream of the first heat exchanger (12) for blowing out the air to the vehicle windshield glass, an internal air inlet (22) arranged upstream of the first heat exchanger (12) in the air flow for introducing the air from the cabin, and an external air inlet (23) arranged upstream of the first heat exchanger (12) for introducing the air from outside the cabin wherein, as long as the electrical equipment on board the vehicle is not supplied with power, the air path (C) leading from the first heat exchanger (12) to the defroster opening (19) passes air while at the same time passing the air through the air path (E) leading from the first heat exchanger (12) to the external air inlet (23).

As a result, as in the first embodiment of the invention, the refrigerant that has leaked out can be prevented from flowing into the cabin by simple means without providing any protective device such as a sensor.

According to a sixth aspect of the invention, there is provided an automotive climate control system wherein a second heat exchanger (13) for heating the air is arranged between the first heat exchanger (12) and the three openings (17 to 19) in the air-conditioning casing (11), and as long as the electrical equipment mounted on the vehicle is not supplied with power, the air flowing from the first heat exchanger (12) toward the second heat exchanger (13) passes in its entirety through the second heat exchanger (13).

As a result, the air resistance in the air path in the openings (17 to 19) can be further increased, so that the refrigerant that has leaked out from the first heat exchanger (12) can be positively passed to the external air inlet (23). Thus, the refrigerant can be prevented without fail from flowing into the cabin.

According to a seventh aspect of the invention, there is provided an automotive climate control system, comprising an air-conditioning casing (11) having arranged therein a second heat exchanger (13) between a first heat exchanger (12) and three openings (17 to 19) for heating the air, a bypass (14) for causing the air passing from the first heat exchanger (12) toward the second heat exchanger (13) to bypass the second heat exchanger (13) and a bypass amount regulation means (15) for regulating the air passage in the bypass (14), wherein the bypass amount regulation means (15) closes the bypass (14) as long as the electrical equipment mounted on the vehicle is not supplied with power.

As a result, the air resistance in the air path in the openings (17 to 19) can be further increased, so that the refrigerant that has leaked out from the first heat exchanger (12) can be positively made to flow to the external air inlet (23). Thus the refrigerant can be prevented without fail from flowing into the cabin.

According to an eighth aspect of the invention, there is provided an automotive climate control system, wherein a fluid having a higher density than air is used as a refrigerant, and the external air inlet (23) is arranged at a position lower than the defroster opening (19).

As a result, the refrigerant heavier than air which may leak out little by little from the first heat exchanger (12) when the ignition switch is in off state, for example, can be discharged out of the cabin from the external air inlet (23) earlier than from the openings (17 to 19) inside the cabin, and therefore the refrigerant can be prevented from flowing into the cabin more positively.

The present invention may be more fully understood from the description of preferred embodiments of the invention set forth below, together with the accompanying drawings.

BRIEF DESCRIPTION OF THE DRAWINGS

FIG. 2 is a diagram schematically showing the flow of the refrigerant which may leak out from an automotive climate control system according to an embodiment of the invention.

DESCRIPTION OF THE PREFERRED EMBODIMENTS

Figure 1:
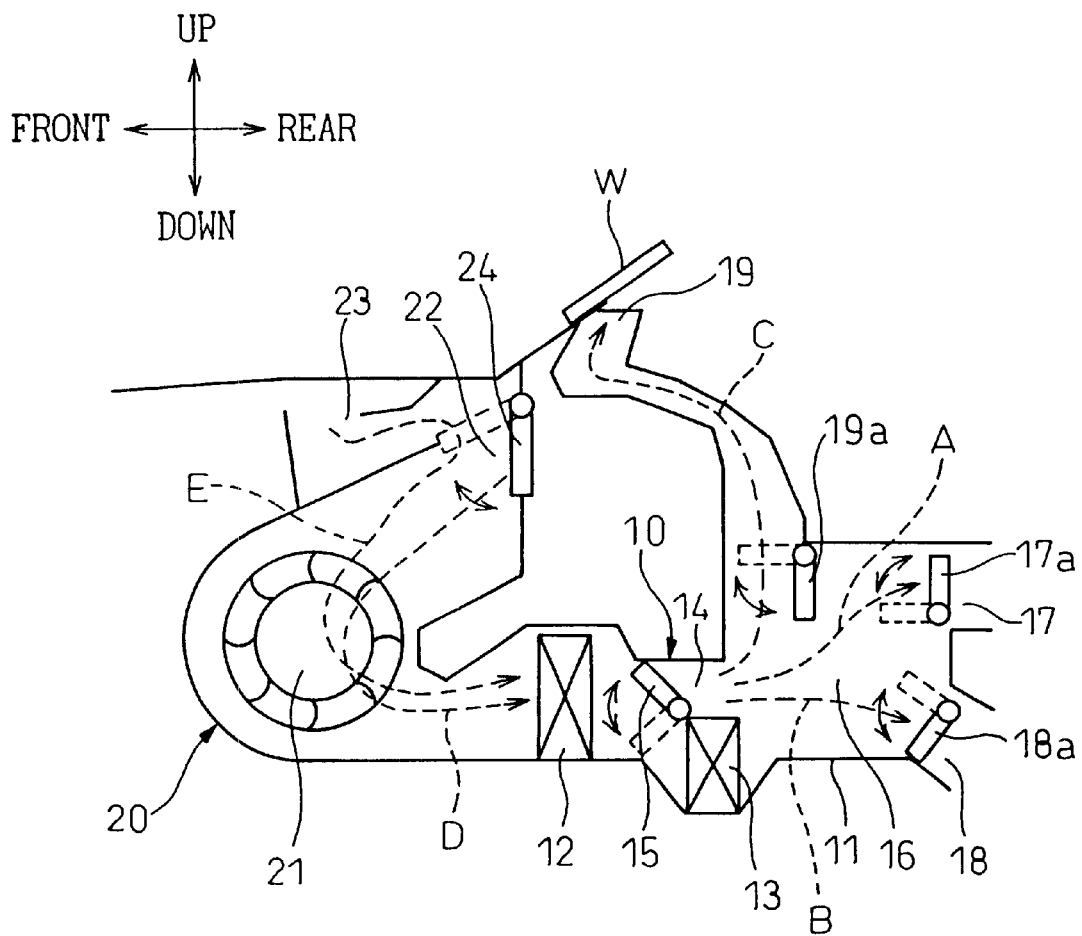
FIG. 1 is a diagram schematically showing an automotive climate control system according to an embodiment of the present invention.

FIG. 1 is a diagram schematically showing an automotive climate control system according to an embodiment of the present invention. Reference numeral 10 designates an air-conditioning unit for harmonizing the air blown out into the cabin, and numeral 20 a fan unit for blowing the air into the air-conditioning unit 10.

Numeral 11 designates an air-conditioning casing for passing the air to be blown out into the cabin. The air-conditioning casing 11 has arranged therein an evaporator (first heat exchanger) 12 for cooling the air flowing in the air-conditioning casing 11 and a heater core (second heat exchanger) 13 arranged downstream of the evaporator 12 in the air path for heating the air.

The evaporator 12 is a heat exchanger on the low pressure side of a vapor compression refrigeration cycle in which the refrigeration performance is exhibited by compressing and reducing the pressure of a refrigerant and then evaporating the refrigerant reduced in pressure. The heater core 13 is for heating the air with the cooling water for the running engine (not shown) as a heat source.

This embodiment employs a vapor compression refrigeration cycle using carbon dioxide as a refrigerant. In the vapor compression refrigeration cycle, a supercritical state occurs in which the refrigerant pressure on high pressure side is not lower than the critical pressure of the refrigerant.

The air-conditioning casing 11 also has arranged therein a bypass 14 for causing the air flowing from the evaporator 12 toward the heater core 13 (downstream) to bypass the heater core 13 and flow downstream. Numeral 15 designates an air mix door (bypass amount regulation means) for regulating the air flow in the bypass 14.

According to this embodiment, the flow rate of the cool air cooled by the evaporator 12 and the flow rate of the warm air heated by being passed through the heater core 14 are regulated by adjusting the opening degree (air flow) of the air mix door 15, thereby regulating the temperature of the air blown out into the cabin.

Also, an air mix chamber (air mix space) 16 for mixing the warm air and the cool air is arranged downstream of the heater core 13 and the air mix door 15 in the air flow. The air mix chamber 16 has arranged therein a face opening 17 for blowing out the air to the faces of the occupants in the cabin, a foot opening 18 for blowing out the air to the feet of the occupants in the cabin and a defroster opening 19 for blowing out the air toward the vehicle windshield glass W.

The openings 17 to 19 are opened/closed by first to third blowout mode doors 17a to 19a. By opening/closing the blowout mode doors 17a to 19a, the face mode in which air is blown out from the face opening 17, the foot mode in which air is blown out from the foot opening 18 and the defrost mode in which air is blown out from the defroster opening 19 are switched with each other.

The defroster opening 19 has a plurality of narrow points and turning points, and communicates with the air mix chamber 16 through a defroster duct 19a having a comparatively long path. In defrost mode, therefore, the air resistance increases to a maximum and decreases in foot mode and face mode in that order.

The air resistance in face mode is defined as the pressure loss in the first air path A leading from a blowout air temperature regulation section including the evaporator 12, the heater core 13 and the air mix door 15 to the face opening 17. The air resistance in foot mode is defined as the pressure loss in the second air path B leading from the blowout air temperature regulation section to the foot opening 18. The air resistance in defrost mode is defined as the pressure loss in the third air path C leading from the blowout temperature regulation section to the defroster opening 19.

The fan unit 20 is arranged upstream of the air-conditioning unit 10 in the air flow. The fan unit 20 includes a multiblade centrifugal fan 21, an internal air inlet 22 located upstream of the centrifugal fan 21 in the air flow for introducing the air from the cabin into the air-conditioning casing 11 (fan unit 20), an external air inlet 23 for introducing the air from outside the cabin into the air-conditioning casing 11, and an internal/external air switching door 24 for opening/closing the two inlets 22, 23.

The state in which the air is passed through the fourth air path D from the internal air inlet 22 to the blowout air temperature regulation unit by opening the internal air inlet 22 is hereinafter called the internal air mode, while the state in which the air is passed through the fifth air path E leading from the external air inlet 23 to the blowout air temperature regulation unit by opening the external air inlet 23 is hereinafter called the external air mode.

Now, the operation features of the present embodiment will be explained.

As long as the ignition switch (not shown) is off (the state in which the electrical equipment including the ignition coil and the fuel injection valve mounted on the vehicle are not supplied with power), the blowout is set to defrost mode and the introduced air is set to external mode regardless of the preceding state (the state in which the ignition switch is on) of the blowout and the introduced air.

As a result, in the case where the refrigerant leaks out from the evaporator when the ignition switch is off, the refrigerant that has thus leaked flows out toward the third air path C and the fifth air path E as shown in FIG. 2. The third air path C has a plurality of narrow points and turning points as described above, and a comparatively long path with a large air resistance. The fifth air path E, on the other hand, in which the only device is the centrifugal fan 21, generally has a small air resistance and has a comparatively large area. Most of the refrigerant that has leaked out from the evaporator, therefore, flows toward the fifth air path E having a small air resistance (pressure loss).

Thus, even in the case where the refrigerant leaks out from the evaporator when the ignition switch is off, the leaking refrigerant can be prevented from flowing into the cabin by simple means and without using a protective device such as a sensor.

Further, according to this embodiment, when the ignition switch is off, the bypass 14 is closed up by the air mix door 15 so that the air passing through the evaporator 12 is allowed to pass through the heater core 13 in its entirety. In this way, the pressure loss in the third air path C is further increased, and thus the leaking refrigerant is positively prevented from flowing into the cabin.

According to this embodiment, carbon dioxide larger in density than the air is used as a refrigerant. In the case where the evaporator 12 is mounted at a position lower than the defroster opening 19 and the external air inlet 23 as in this embodiment, therefore, the refrigerant that has leaked out little by little expands upward and gradually come to stay in the air-conditioning casing 11.

In view of this, according to this embodiment, the external air inlet 23 is arranged at a position lower than the defroster opening 19, so that the refrigerant in the air-conditioning casing 11 may flow out of the air-conditioning casing 11 (automotive climate control system) by way of the external air inlet 23 earlier than by way of the defroster opening 19.

Therefore, the refrigerant that has leaked out of the evaporator 12 little by little when the ignition switch is off can be prevented from overflowing the air-conditioning casing 11 (automotive climate control system) and flowing out into the cabin.

Other embodiments will now be explained. Instead of carbon dioxide used as a refrigerant in the aforementioned embodiment, a combustible refrigerant such as propane or other materials such as chlorofluoro hydrocarbon may be used as a refrigerant according to another embodiment.

In the case where a material having a density smaller than air is used as a refrigerant, the external air inlet 23 is not necessarily arranged at a position lower than the defroster opening 19.

Also, unlike the automotive climate control system of an air mix type according to the aforementioned embodiments in which the temperature of the air blown out is regulated by regulating the ratio between warm air and cool air by the air mix door 15, the present invention is not limited to such a configuration. Instead, an automotive climate control system of a reheat type is applicable, in which all the air passing through the evaporator 12 is passed through the heater core 13, and the temperature of the air blown out is regulated by regulating the degree to which the air is heated in the heater core 13.

According to this invention, when the ignition switch is off, the climate control system is set to external air mode while at the same time setting the blowout to a mode with as large an air resistance as possible to prevent the leaking refrigerant from flowing into the cabin. In the case where the air resistance in foot mode (second air path B) is larger than that in external air mode (fifth air path E) according to the embodiments described above, therefore, the climate control system may be set to external air mode and foot mode at the same time when the ignition switch is off.

Further, the air blowout is set to defrost mode in the embodiments described above. According to still another embodiment, however, the blowout may be set to a closed-up mode, if any, in the climate control system.

Furthermore, instead of employing the heater core 13 as means for heating the air as in the embodiments described above, the air may be heated by carrying out the vapor compression refrigeration cycle with a heat pump. In such a case, the evaporator (first heat exchanger) 12 functions as a radiator.

In addition, the foregoing explanation refers to the case in which the ignition switch is off as the state in which the electrical equipment mounted in the vehicle is not supplied with power. As an alternative, the state in which power is not supplied to the electrical equipment mounted on the vehicle may be defined as the one in which an accessory switch is off.

While the invention has been described by reference to specific embodiments chosen for purposes of illustration, it should be apparent that numerous modifications could be made thereto by those skilled in the art without departing from the basic concept and scope of the invention.

What is claimed is:

1. An automotive climate control system comprising:
    an air-conditioning casing (11) for passing the air to be blown out into the cabin;
    a first heat exchanger (12) arranged in said air-conditioning casing (11) for exchanging heat between a refrigerant and the air;
    a face opening (17) arranged downstream of said first heat exchanger (12) in the air flow for blowing out the air to the faces of the occupants in the cabin;
    a foot opening (18) arranged downstream of said first heat exchanger (12) in the air flow for blowing out the air to the feet of the occupants in the cabin;

a defroster opening (19) arranged downstream of said first heat exchanger (12) in the air flow for blowing out the air to the vehicle windshield glass;

an internal air inlet (22) arranged upstream of said first heat exchanger (12) in the air flow for introducing the air from the cabin; and an external air inlet (23) arranged upstream of said first heat exchanger (12) in the air flow for introducing the air from outside the cabin;

wherein when the electrical equipment mounted on the vehicle is not supplied with power, among a first air path (A) leading from the first heat exchanger (12) to the face opening (17), a second air path (B) leading from the first heat exchanger (12) to the foot opening (18) and a third air path (C) leading from the first heat exchanger (12) to the defroster opening (19), only the air path (C) having a larger air resistance than an air path (E) leading from the first heat exchanger (12) to the external air inlet (23) passes air therethrough while, at the same time, air is passed through the air path (E) leading from the first heat exchanger (12) to the external air inlet (23).

2. An automotive climate control system comprising:

an air-conditioning casing (11) for passing the air to be blown out into the cabin therethrough;

a first heat exchanger (12) arranged in the air-conditioning casing (11) for exchanging heat between the refrigerant and the air;

a face opening (17) arranged downstream of the first heat exchanger (12) in the air flow for blowing out the air to the faces of the occupants in the cabin;

a foot opening (18) arranged downstream of the first heat exchanger (12) in the air flow for blowing out the air to the feet of the occupants in the cabin;

a defroster opening (19) arranged downstream of the first heat exchanger (12) for blowing out the air to the vehicle windshield glass;

an internal air inlet (22) arranged upstream of the first heat exchanger (12) in the air flow for introducing the air from the cabin; and an external air inlet (23) arranged upstream of the first heat exchanger (12) in the air flow for introducing the air from outside the cabin;

wherein as long as the electrical equipment mounted on the vehicle is not supplied with power, among a first air path (A) leading from the first heat exchanger (12) to the face opening (17), a second air path (B) leading from the first heat exchanger (12) to the foot opening (18) and a third air path (C) leading from the first heat exchanger (12) to the defroster opening (19), only the air path (C) having the largest air resistance passes the air while, at the same time, air is passed through an air path (E) leading from the first heat exchanger (12) to the external air inlet (23).

3. An automotive climate control system comprising an air-conditioning casing (11) for passing the air to be blown out into the cabin therethrough;

a first heat exchanger (12) arranged in the air-conditioning casing (11) for exchanging heat between the refrigerant and the air;

a face opening (17) arranged downstream of the first heat exchanger (12) in the air flow for blowing out the air to the faces of the occupants in the cabin;

a foot opening (18) arranged downstream of the first heat exchanger (12) in the air flow for blowing out the air to the feet of the occupants in the cabin;

a defroster opening (19) arranged downstream of the first heat exchanger (12) for blowing out the air to the vehicle windshield glass;

an internal air inlet (22) arranged upstream of the first heat exchanger (12) in the air flow for introducing the air from the cabin; and an external air inlet (23) arranged upstream of the first heat exchanger (12) for introducing the air from outside the cabin;

wherein, as long as the electrical equipment mounted on the vehicle is not supplied with power, the air path (C) leading from the first heat exchanger (12) to the defroster opening (19) passes air therethrough while, at the same time, air is passed through an air path (E) leading from the first heat exchanger (12) to the external air inlet (23).

4. An automotive climate control system comprising an air-conditioning casing (11) for passing the air to be blown out into the cabin therethrough;

a first heat exchanger (12) arranged in the air-conditioning casing (11) for exchanging heat between the refrigerant and the air;

a face opening (17) arranged downstream of the first heat exchanger (12) in the air flow for blowing out the air to the faces of the occupants in the cabin;

a foot opening (18) arranged downstream of the first heat exchanger (12) in the air flow for blowing out the air to the feet of the occupants in the cabin;

a defroster opening (19) arranged downstream of the first heat exchanger (12) for blowing out the air to the vehicle windshield glass;

an internal air inlet (22) arranged upstream of the first heat exchanger (12) in the air flow for introducing the air from the cabin; and an external air inlet (23) arranged upstream of the first heat exchanger (12) for introducing the air from outside the cabin;

wherein, as long as the electrical equipment mounted on the vehicle is not supplied with power, among a first air path (A) leading from the first heat exchanger (12) to the face opening (17), a second air path (B) leading from the first heat exchanger (12) to the foot opening (18) and a third air path (C) leading from the first heat exchanger (12) to the defroster opening (19), only the air path (C) passes the air therethrough, while at the same time air is passed through an air path (E) leading from the first heat exchanger (12) to the external air inlet (23).

5. An automotive climate control system comprising an air-conditioning casing (11) for passing the air to be blown out into the cabin therethrough;

a first heat exchanger (12) arranged in the air-conditioning casing (11) for exchanging heat between the refrigerant and the air;

a face opening (17) arranged downstream of the first heat exchanger (12) in the air flow for blowing out the air to the faces of the occupants in the cabin;

a foot opening (18) arranged downstream of the first heat exchanger (12) in the air flow for blowing out the air to the feet of the occupants in the cabin;

a defroster opening (19) arranged downstream of the first heat exchanger (12) for blowing out the air to the vehicle windshield glass;

an internal air inlet (22) arranged upstream of the first heat exchanger (12) in the air flow for introducing the air from the cabin; and an external air inlet (23) arranged upstream of the first heat exchanger (12) for introducing the air from outside the cabin;

wherein, as long as the electrical equipment mounted on the vehicle is not supplied with power, a first air path (A) leading from the first heat exchanger (12) to the face opening (17), a second air path (B) leading from the first heat exchanger (12) to the foot opening (18) and a third air path (C) leading from the first heat exchanger (12) to the defroster opening (19) are all closed, while at the same time air is passed through an air path (E) leading from the first heat exchanger (12) to the external air inlet (23).

6. An automotive climate control system according to claim 1, wherein a second heat exchanger (13) for heating the air is arranged between the first heat exchanger (12) and the three openings (17 to 19) in the air-conditioning casing (11), and as long as the electric equipment mounted on the vehicle is not supplied with power, the air flowing from the first heat exchanger (12) toward the second heat exchanger (13) is passed in its entirety through the second heat exchanger (13).

7. An automotive climate control system according to claim 1, wherein said air-conditioning casing (11) includes therein:

a second heat exchanger (13) arranged between the first heat exchanger (12) and the three openings (17 to 19) for heating the air;

a bypass (14) for causing the air passing from the first heat exchanger (12) toward the second heat exchanger (13) to bypass the second heat exchanger (13); and a bypass amount adjusting means (15) for adjusting the air passed through the bypass (14);

wherein the bypass amount adjusting means (15) closes the bypass (14) in the case where the electrical equipment mounted on the vehicle is not supplied with power.

8. An automotive climate control system according to claim 1, wherein a fluid having a higher density than air is used as a refrigerant, and the external air inlet (23) is arranged at a position lower than the defroster opening (19).

* * * * *